(12) United States Patent
Gao et al.

(10) Patent No.: US 11,493,775 B2
(45) Date of Patent: Nov. 8, 2022

(54) MINIATURE, DURABLE POLARIZATION DEVICES

(71) Applicant: Moxtek, Inc., Orem, UT (US)

(72) Inventors: Liang Gao, American Fork, UT (US); Shaun Ogden, Saratoga Springs, UT (US)

(73) Assignee: Moxtek, Inc., Orem, UT (US)

( * ) Notice: Subject to any disclaimer, the term of this patent is extended or adjusted under 35 U.S.C. 154(b) by 235 days.

(21) Appl. No.: 17/035,184

(22) Filed: Sep. 28, 2020

(65) Prior Publication Data

US 2021/0026151 A1  Jan. 28, 2021

Related U.S. Application Data

(62) Division of application No. 15/943,324, filed on Apr. 2, 2018, now Pat. No. 10,838,220.

(60) Provisional application No. 62/485,457, filed on Apr. 14, 2017.

(51) Int. Cl.

| C03B 33/07 | (2006.01) |
| --- | --- |
| G02B 27/28 | (2006.01) |
| G02B 5/30 | (2006.01) |
| G02B 5/04 | (2006.01) |
| C03B 37/07 | (2006.01) |

(52) U.S. Cl.
CPC ............ *G02B 27/283* (2013.01); *C03B 33/07* (2013.01); *C03B 37/07* (2013.01); *G02B 5/04* (2013.01); *G02B 5/3058* (2013.01)

(58) Field of Classification Search
CPC .............................. C03B 33/07; C03B 33/072
See application file for complete search history.

(56) References Cited

U.S. PATENT DOCUMENTS

| 6,208,463 | B1 | 3/2001 | Hansen et al. | |
| --- | --- | --- | --- | --- |
| 6,212,014 | B1 | 4/2001 | Lehman, Jr. et al. | |
| 6,284,085 | B1 | 9/2001 | Gwo | |
| 6,288,840 | B1 | 9/2001 | Perkins et al. | |
| 6,548,176 | B1 | 4/2003 | Gwo | |
| 6,690,521 | B2 | 2/2004 | Hashizume et al. | |
| 6,714,350 | B2 | 3/2004 | Silverstein et al. | |
| 7,085,050 | B2 | 8/2006 | Florence | |
| 7,570,424 | B2 | 8/2009 | Perkins et al. | |
| 7,961,393 | B2 | 6/2011 | Perkins et al. | |
| 8,467,128 | B2 | 6/2013 | Huang | |
| 8,755,113 | B2 | 6/2014 | Gardner et al. | |
| 9,726,897 | B2 | 8/2017 | Huang et al. | |
| 2003/0214716 | A1* | 11/2003 | Drazic ................ | G02B 5/3066 156/99 |
| 2005/0018309 | A1* | 1/2005 | McGuire ............ | G02B 27/0081 359/630 |
| 2007/0152358 | A1 | 7/2007 | Suganuma e | |

(Continued)

FOREIGN PATENT DOCUMENTS

JP            2006091357 A       4/2006

*Primary Examiner* — Cynthia Szewczyk
(74) *Attorney, Agent, or Firm* — Thorpe, North & Western, LLP

(57) ABSTRACT

Polarizing optical devices described herein, and polarizing optical devices resulting from methods described herein, can be small and can have high heat tolerance. Wires of wire grid polarizers can be attached directly to prisms of the polarizing optical devices, allowing for small size. Multiple polarizing optical devices can be attached by adhesive-free bonding techniques, allowing high heat tolerance.

20 Claims, 5 Drawing Sheets

(56) References Cited

U.S. PATENT DOCUMENTS

| | | |
|---|---|---|
| 2007/0153381 A1 | 7/2007 | Komatsu et al. |
| 2007/0297052 A1 | 12/2007 | Wang et al. |
| 2010/0328769 A1 | 12/2010 | Perkins |
| 2011/0075107 A1 | 3/2011 | Teijido et al. |
| 2012/0008205 A1 | 1/2012 | Perkins et al. |
| 2012/0075699 A1 | 3/2012 | Davis et al. |
| 2012/0183739 A1 | 7/2012 | Kim et al. |
| 2014/0300964 A1 | 10/2014 | Davis et al. |
| 2015/0075222 A1 | 3/2015 | Mader |
| 2015/0346497 A1 | 12/2015 | Huang et al. |
| 2015/0362738 A1* | 12/2015 | Freitag .................. C03B 19/02 264/1.7 |
| 2016/0231487 A1 | 8/2016 | Wangensteen et al. |
| 2017/0068103 A1 | 3/2017 | Huang et al. |
| 2017/0293059 A1 | 10/2017 | Nielson et al. |
| 2017/0322425 A1 | 11/2017 | Wang et al. |
| 2018/0052257 A1 | 2/2018 | Nielson et al. |

\* cited by examiner

MINIATURE, DURABLE POLARIZATION DEVICES

CLAIM OF PRIORITY

This is a divisional of U.S. patent application Ser. No. 15/943,324, filed on Apr. 2, 2018, which claims priority to U.S. Provisional Patent Application No. 62/485,457, filed on Apr. 14, 2017, which are incorporated herein by reference.

FIELD OF THE INVENTION

The present application is related generally to polarizing devices.

BACKGROUND

Cube polarizing beam splitters can include a plate-polarizer (array of wires on a glass substrate) sandwiched between two prisms. See for example U.S. Pat. Nos. 6,212,014; 7,085,050; and 8,467,128; and USA patent publication numbers US 2007/0297052; US 2007/0297052; US 2015/0346497; and US 2017/0068103. The inventions described in these patent publications may be sufficient for many traditional applications.

New applications of cube polarizing beam splitters have more demanding specifications. For example, head-mounted displays may require a very small cube polarizing beam splitter, such as for example with a diameter of about 1 mm. A plate-polarizer can be about 0.7 mm thick due to substrate thickness, resulting in an overall diameter larger than 1 mm after being sandwiched between prisms.

Another requirement of some new applications is high heat tolerance. Projection display units are increasingly smaller with higher intensity light sources, increasing the need for high heat tolerance. The adhesive used to bond the plate-polarizer to the prisms can fail due to the high heat.

Other optical devices, such as X-Cubes, may also need to be small and have high heat tolerance.

SUMMARY

It has been recognized that it would be advantageous to provide polarizing optical devices, including cube polarizing beam splitters and X-Cubes, which are small and have high heat tolerance. The present invention is directed to various embodiments of polarizing optical devices, and methods of making polarizing optical devices, that satisfy these needs. Each embodiment may satisfy one, some, or all of these needs.

A method of manufacturing polarizing devices can comprise the following steps:
1. providing a plate-polarizer including a substrate having a first side and an opposite, second side, and an array of elongated wires located at the first side, an imaginary line extending across the first side and either parallel to or perpendicular to the wires, and an imaginary plane passing through the imaginary line and perpendicular to the first side;
2. cutting a first cut parallel to the imaginary line, at a first angle that is oblique with respect to the imaginary plane, the first cut extending through the plate-polarizer from the first side to the second side;
3. cutting a second cut parallel to the imaginary line, at a second angle that is oblique with respect to the imaginary plane, the second cut extending through the plate-polarizer from the first side to the second side, the second angle being on an opposite side of the imaginary plane from the first angle; and
4. repeating the first cut and the second cut, but shifted over and spaced to form prisms.

A method of manufacturing a cube polarizer can comprise the following steps:
1. providing an embedded wire grid polarizer including a first substrate, a second substrate, and a first array of elongated wires sandwiched between the first substrate and the second substrate;
2. cutting a first cut through the embedded wire grid polarizer parallel to an imaginary line, the imaginary line extending across an outer-side of the first substrate and either parallel to or perpendicular to the wires, at a first angle that is oblique with respect to an imaginary plane, the imaginary plane passing through the imaginary line and perpendicular to the first array of elongated wires, the first cut extending through the first substrate, the second substrate, and the first array of elongated wires;
3. cutting a second cut through the embedded wire grid polarizer parallel to the imaginary line, at a second angle that is oblique with respect to the imaginary plane, the second cut extending through the first substrate, the second substrate, and the first array of elongated wires, the second angle being on an opposite side of the imaginary plane from the first angle; and
4. repeating the first cut and the second cut, but shifted over and spaced to form a prism with two pairs of parallel, opposite cut-sides formed by the first cut and the second cut.

BRIEF DESCRIPTION OF THE DRAWINGS (DRAWINGS MIGHT NOT BE DRAWN TO SCALE)

FIG. 1 is a schematic, perspective-view of a prism 10 with two opposite ends 11 connected to each other by two inner sides 12 and an outer side 13, in accordance with an embodiment of the present invention.

FIG. 2 is a schematic end-view of a polarizing cube 20 with four prisms 10 combined with the outer sides 13 facing outward, each inner side 12 facing an inner side 12 of an adjacent prism 10, mating prism ends 11 forming opposite cube ends, and at least one wire grid polarizer 14 at an outer side 13 of at least one of the prisms 10, in accordance with an embodiment of the present invention.

Figure 8:
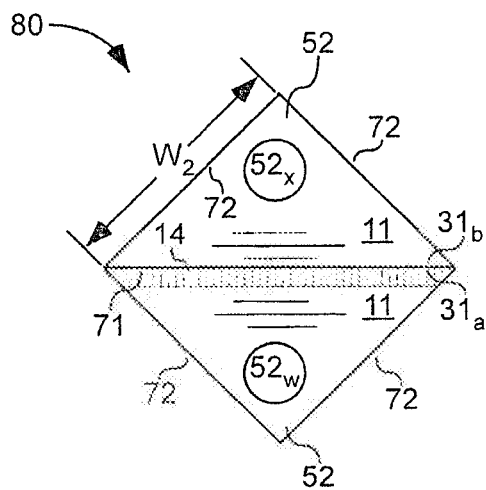
Figure 9:
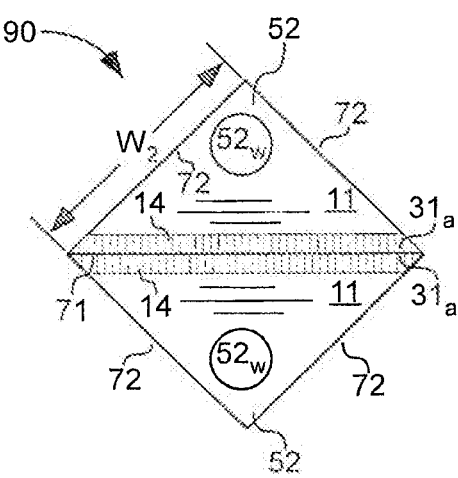
Figure 10:
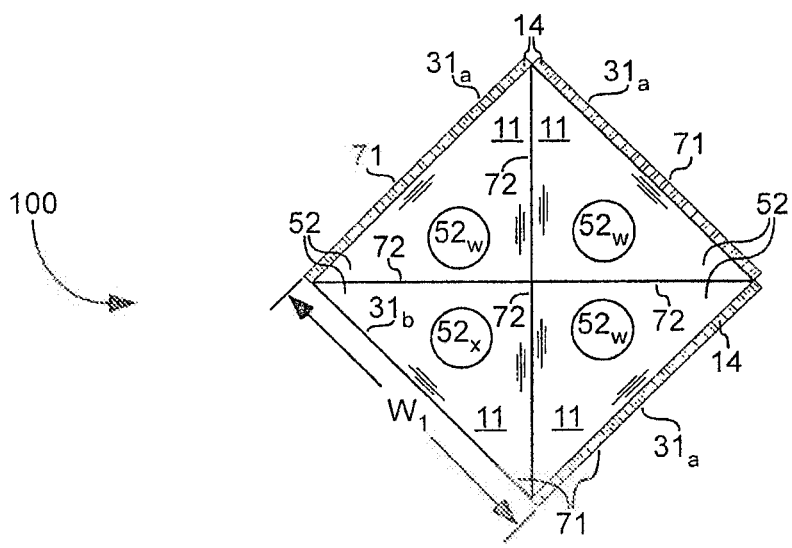

FIGS. 8-10 are schematic end-views of polarizing cubes 80, 90, and 100 which can be made by assembling prisms 52 resulting from the method illustrated in FIGS. 3-6, in accordance with embodiments of the present invention.

Figure 11:
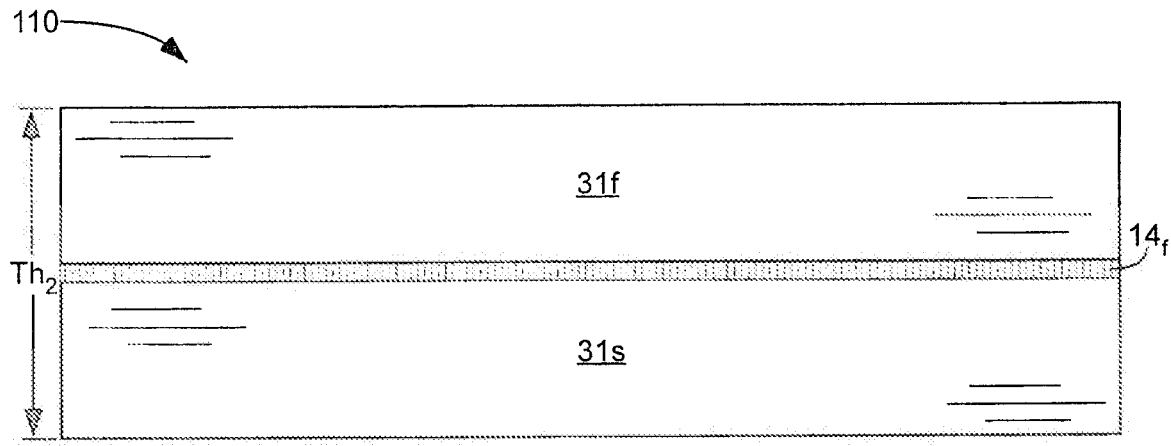
Figure 12:
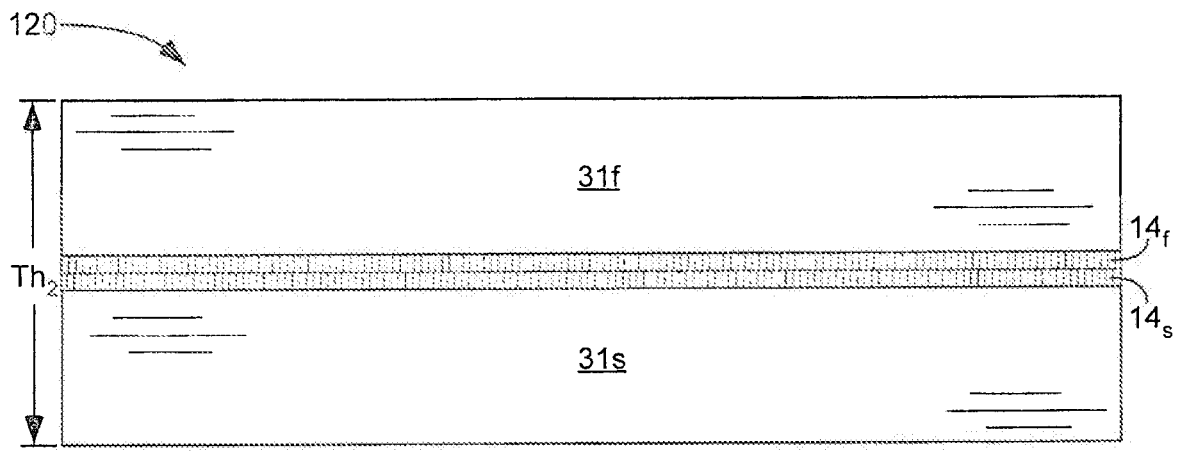
Figure 13:
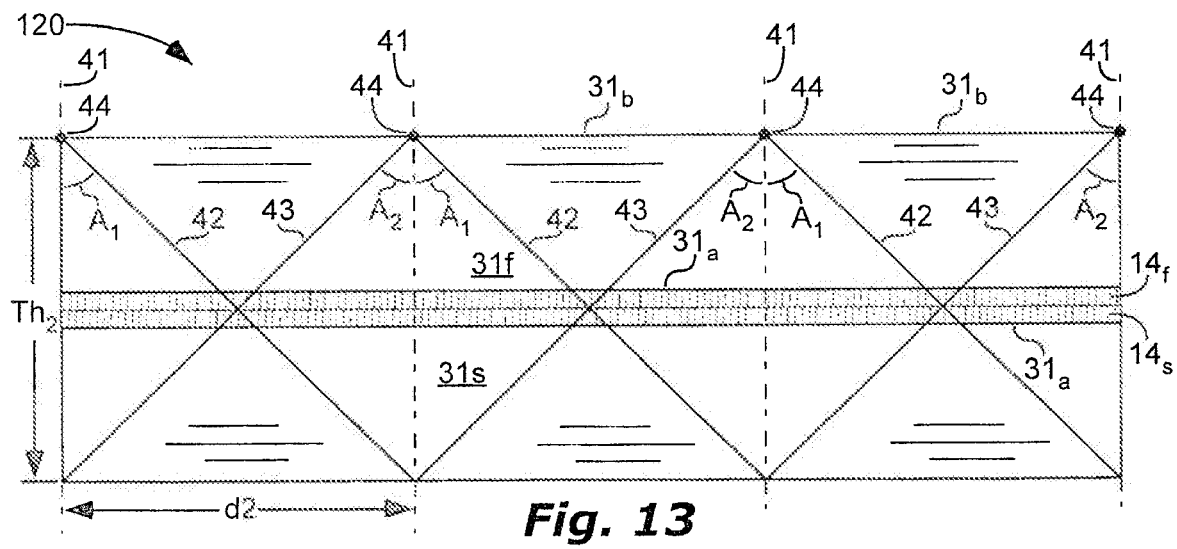

FIGS. 11-13 illustrate steps in methods of manufacturing cube polarizers, in accordance with embodiments of the present invention.

DEFINITIONS

As used herein, the term "isosceles trapezoid-shape" means that non-parallel sides have equal length and join parallel sides at equal angles. As used in this definition, "equal length" means exactly equal length, equal length within normal manufacturing tolerances, or nearly equal length, such that any deviation from exactly equal length would have negligible effect for ordinary use of the device.

As used herein, the term "equal" with regard to angles, means exactly equal, equal within normal manufacturing tolerances, or nearly equal, such that any deviation from exactly equal would have negligible effect for ordinary use of the device.

As used herein, the term "mm" means millimeter(s).

As used herein, the term "on" means located directly on or located above with some other solid material between.

As used herein, the term "parallel" means exactly parallel, or substantially parallel, such that planes or vectors associated with the devices in parallel would intersect with an angle of ≤20°. Intersection of such planes or vectors can be ≤0.01°, ≤0.1°, ≤1°, ≤5°, ≤10°, or ≤15° if explicitly so stated.

As used herein, the term "perpendicular" means exactly perpendicular, or within 20° of exactly perpendicular. The term "perpendicular" can mean within 0.1°, within 1°, within 5°, within 10°, or within 15° of exactly perpendicular if explicitly so stated in the claims.

As used herein, the term "plate-polarizer" means a polarizer with an array of wires on a sheet or wafer. The sheet or wafer can be flat or planar with the wires located on one flat or planar side. A width of this flat or planar side can be much greater (e.g. at least 10 times greater or at least 100 times greater) than a thickness of the sheet or wafer.

As used herein, the term "substrate" means a base material, such as for example a glass wafer. Unless specified otherwise in the claims, the term "substrate" also includes any thin film(s) sandwiched between the glass wafer and the wires of the polarizer.

DETAILED DESCRIPTION

Figure 1:
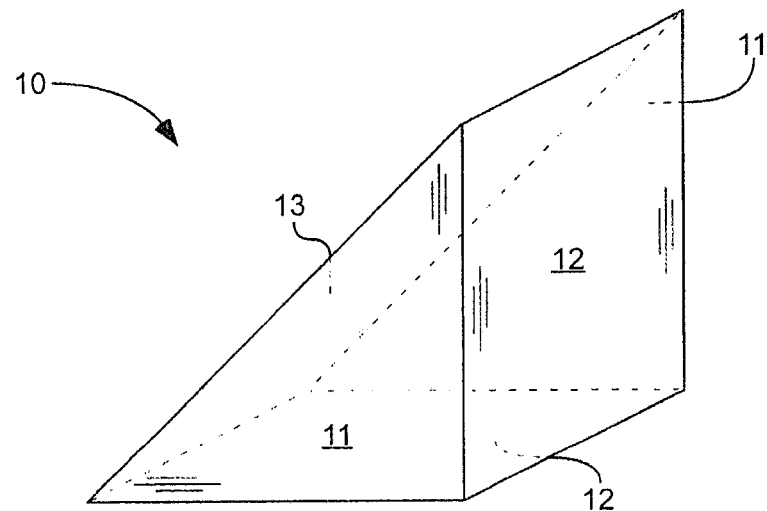

As illustrated in FIG. 1, a prism 10 is shown comprising two opposite ends 11 connected to each other by two inner sides 12 and an outer side 13. This prism 10, along with additional, similar prisms, can form a polarizing cube.

Figure 2:
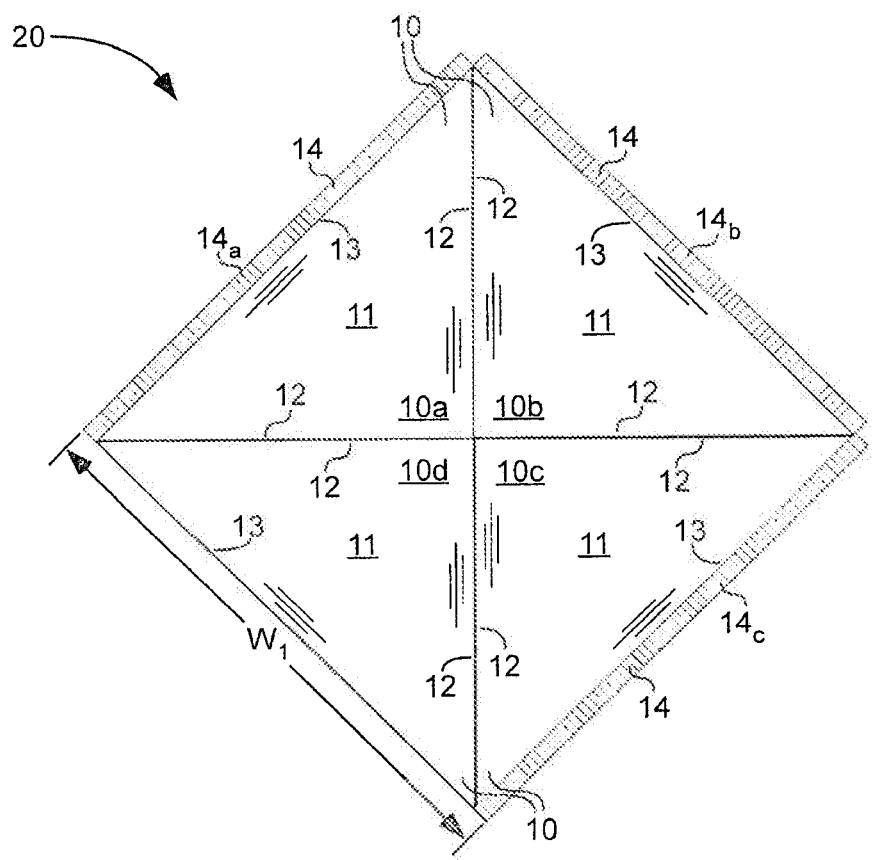
Figure 3:
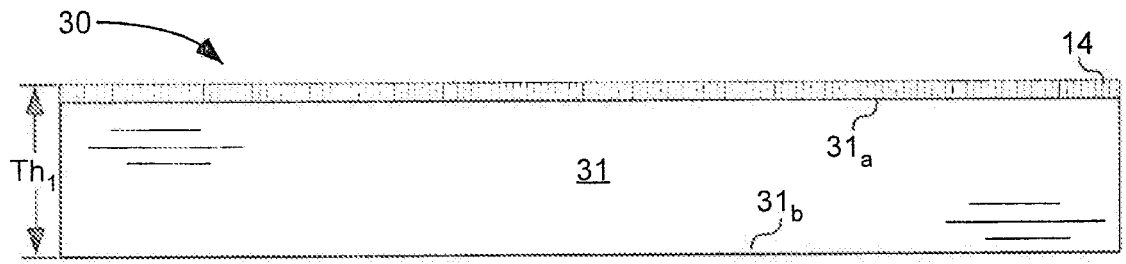
FIGS. 3-6 illustrate steps in methods of manufacturing polarizing devices, in accordance with embodiments of the present invention.
Figure 4A:
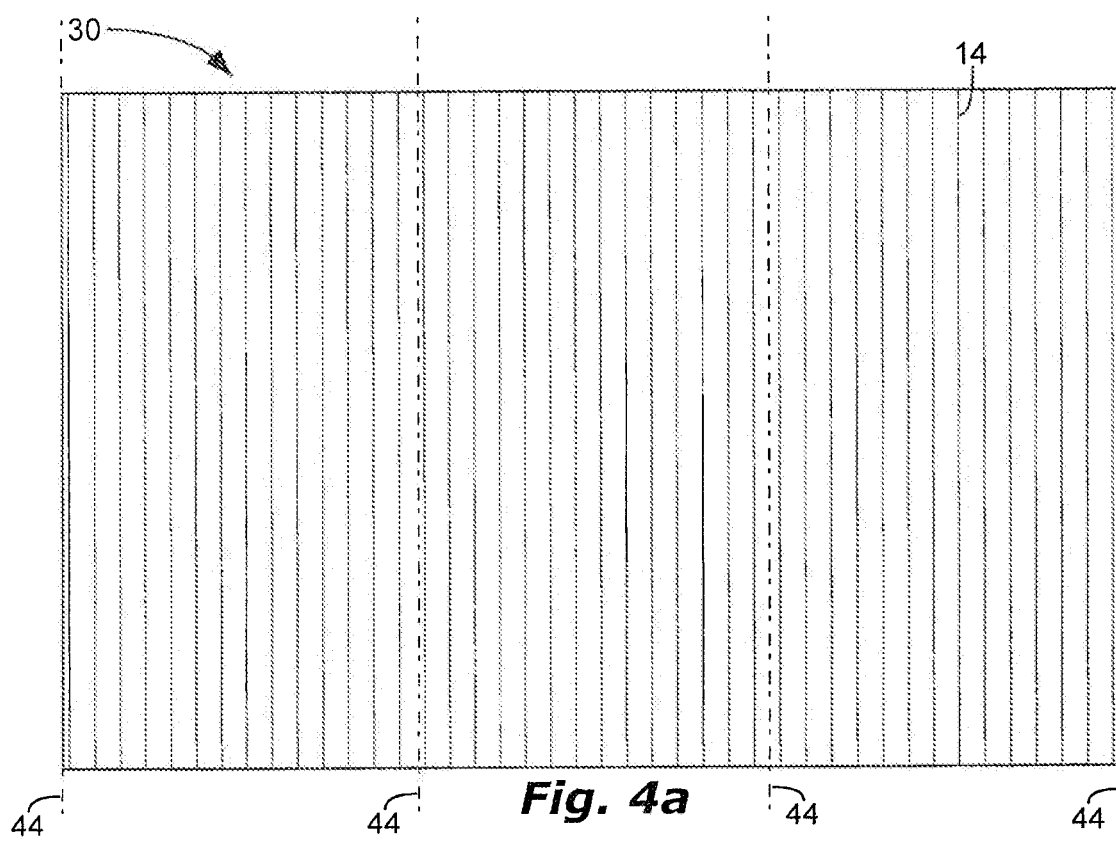
Figure 4B:
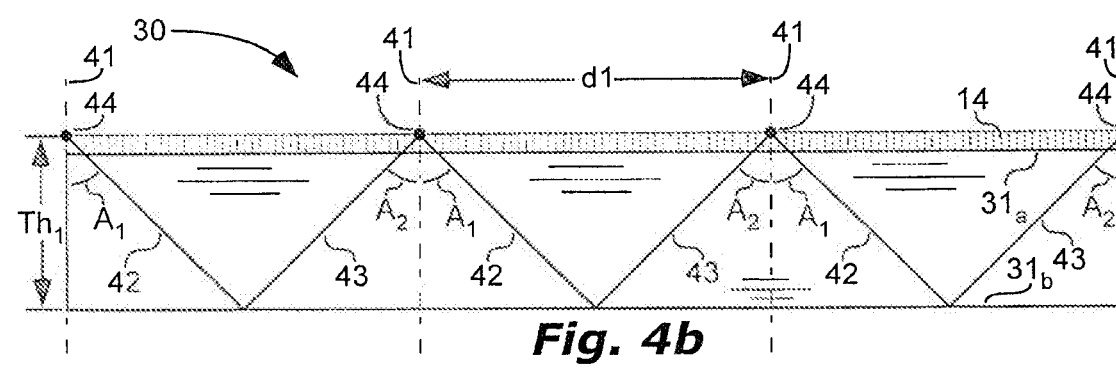

As illustrated in FIG. 2, four prisms 10 can be combined into a polarizing cube 20 with the outer sides 13 facing outward, each inner side 12 facing an inner side 12 of an adjacent prism 10. Mating prism ends 11 can form two opposite cube ends. Examples of shapes of the two opposite cube ends 11 include square, rectangular, and other parallelogram shapes.

A first wire grid polarizer 14a can be located at the outer side 13 of a first of the four prisms 10a. A second wire grid polarizer 14b can be located at the outer side 13 of a second of the four prisms 10b. A third wire grid polarizer 14c can be located at the outer side 13 of a third of the four prisms 10c. Although not shown in the figures, there may be a fourth wire grid polarizer located at the outer side 13 of a fourth of the four prisms 10d. The typical arrangement would be three wire grid polarizers 14a-c as shown in FIG. 2. Each of the wire grid polarizers 14a-c can comprise an array of elongated wires 14. The array of elongated wires 14 on one polarizer can be separate from the array of elongated wires 14 of other wire grid polarizers. The wires 14 of the wire grid polarizers 14 described herein can have small pitch, such as for example ≤200 nm.

The polarizing cube 20 of FIG. 2 can be a color-combining optic, such as for example an X-Cube. X-Cubes are sometimes referred to as X-Cube prisms, X-prisms, light recombination prisms, or cross dichroic prisms. X-Cubes are typically made of four right angle prisms, with dichroic coatings on one or more of the inner sides 12.

As shown in FIG. 2, the array of elongated wires 14 of each of the wire grid polarizers 14a-c can adjoin (can be attached directly to) the material (e.g. glass) of the prisms 10a-c, respectively. This is in contrast to making a plate-polarizer with wires attached to a substrate, then attaching this substrate to the prism. This allows the polarizing cube 20 to be much smaller. For example, the polarizing cube 20 can have a maximum width $W_1$ of ≤7 mm, ≤4.5 mm, ≤3.4 mm, ≤2.5 mm, ≤2 mm, ≤1.5 mm, ≤1.3 mm, ≤1.1 mm, or ≤0.9 mm. The maximum width $W_1$ can be a straight-line distance, from and perpendicular to one outer side 13, to an opposite outer side 13. This maximum width $W_1$ can be approximately two times a thickness $Th_1$ of a substrate 31 of the wire grid polarizer 30 (see FIG. 3).

A method of manufacturing polarizing devices, such as for example the polarizing cubes 20 and 100 of FIGS. 2 and 10 or the polarizing cubes 80 and 90 of FIGS. 8-9, can comprise some or all of the following steps. The steps can be performed in the following or other order. There may be additional steps not described below. These additional steps may be before, between, or after those described. This method is illustrated in FIGS. 3-10.

1. Providing a plate-polarizer 30 including:
    a) a substrate 31 having a first side $31_a$ and an opposite, second side $31_b$ (the first side $31_a$ can be parallel to the second side $31_b$) and a polarizer including an array of elongated wires 14 located at the first side $31_a$ (i.e. located on the first side, embedded in the first side, or partially embedded in the first side);
    b) an imaginary line 44 (across the top view in FIG. 4a and into the page of FIG. 4b) extending across the first side $31_a$ and either parallel to or perpendicular to the wires 14 (parallel to the wires 14 in FIGS. 4a & 4b);
    c) an imaginary plane 41 (into the page of FIGS. 4a & 6) passing through the imaginary line 44 and perpendicular to the first side $31_a$.
2. Cutting a first cut 42 parallel to the imaginary line 44, at a first angle $A_1$ that is oblique with respect to the imaginary plane 41, the first cut extending through the plate-polarizer 30 from the first side $31_a$ to the second side $31_b$.
3. Cutting a second cut 43 parallel to the imaginary line 44, at a second angle $A_2$ that is oblique with respect to the imaginary plane 41, the second cut 43 extending through the plate-polarizer 31 from the first side $31_a$ to the second side $31_b$, the second angle $A_2$ being on an opposite side of the imaginary plane 41 from the first angle $A_1$.
4. Repeating the first cut 42 and the second cut 43, but shifted over (distance d1) and spaced to form prisms 52 with ends 11 connected by cut-sides formed by the first cuts 42 and the second cuts 43 and connected by the first side $31_a$ and/or the second side $31_b$. Each subsequent first cut 42 can have the same oblique angle as the prior first cut 42, or can be different from the prior first cut 42. Similarly, each subsequent second cut 43 can have the same oblique angle as the prior second cut 43, or can be different from the prior second cut 43.

Prism ends 11 can have various shapes, including a triangle-shape, a trapezoid-shape, or an isosceles trapezoid-shape. The repeated first cuts 42 and second cuts 43 can form ends 11 with a repeating shape. Each repeated imaginary line 44 and imaginary plane 41 can be parallel to the preceding imaginary line 44 and imaginary plane 41, respectively.

In the above method, the first cut 42 can be made, then the second cut 43, then repeated first cut 42/second cut 43. These cuts 42 and 43 can also be made in another order, such as for example, multiple first cuts 42, then multiple second cuts 43.

Figure 5:
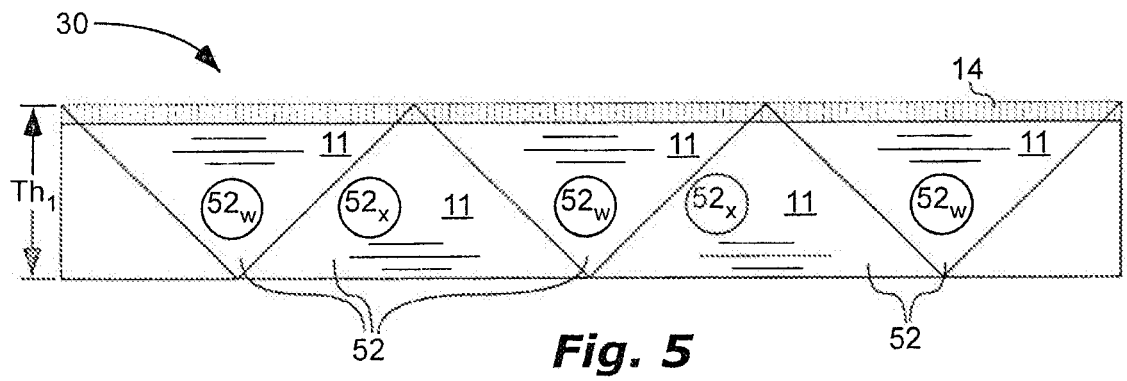

One way to form repeating ends 11 with a triangle-shape, as shown in FIGS. 4-5, is for the first angle $A_1$ and the second angle $A_2$ to be equal to 45° and for the shifted over distance d1 to equal two times a thickness $Th_1$ of the plate-polarizer 30 plus the saw blade kerf. The first angle $A_1$ and the second angle $A_2$ can have other values. For example, the first angle $A_1$ and/or the second angle $A_2$ can be ≥10°, ≥30°, or ≥40° and can be ≤50°, ≤60°, or ≤80°.

Figure 6:
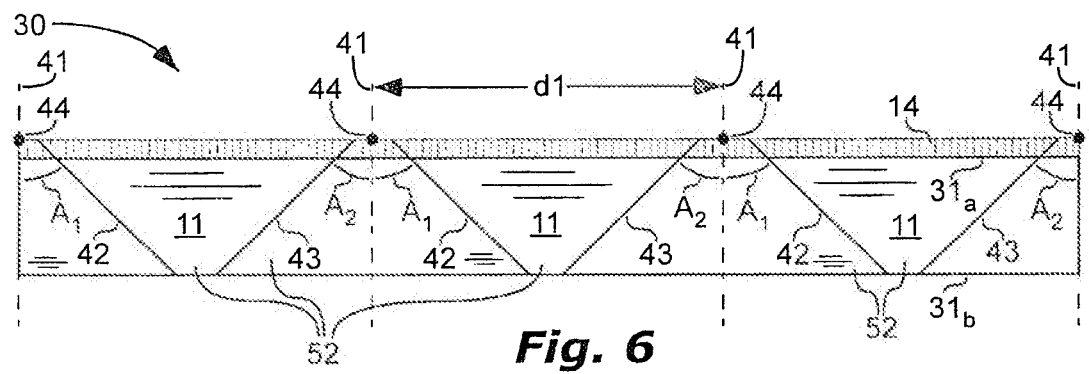

Repeating ends 11 with a trapezoid-shape are shown in FIG. 6. The first angle $A_1$ and the second angle $A_2$ and/or the shifted over distance d1 can be adjusted to achieve the desired trapezoid-shape.

Figure 7:
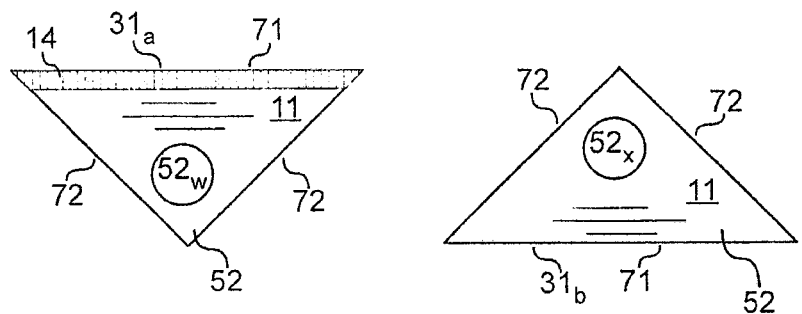
FIG. 7 shows schematic end-views of prisms 52, which can be made from the method illustrated in FIGS. 3-6, in accordance with an embodiment of the present invention.

Illustrated in FIG. 7 are two prisms 52 resulting from the above method, each prism 52 with ends 11 that are triangle-shaped and connected by two cut sides 72 (formed by the first cuts 42 and the second cuts 43) and an uncut side 71. The uncut side 71 of prism $52_w$ is the first side $31_a$ with the array of elongated wires 14. The uncut side 71 of prism $52_x$ is the second side $31_b$ without the array of elongated wires 14.

Illustrated in FIGS. 8-9 are two prisms 52 attached together to form polarizing cubes 80 and 90 with the uncut-sides 71 facing inward and facing each other and the cut-sides 72 facing outwards. The uncut-side 71 of one of the prisms $52_w$ of polarizing cube 80 is the first side $31_a$ with the array of elongated wires 14 and the uncut-side 71 of the mating prism $52_x$ is the second side $31_a$ without the array of elongated wires 14. The uncut-sides 71 of both prisms $52_w$ of polarizing cube 90 are the first sides $31_a$ with the arrays of elongated wires 14. Polarizing cube 80 can have higher transmission of the desired polarization and polarizing cube 90 can have higher contrast, so each can be useful for different applications.

Thus, a polarizing cube 80 can include an array of elongated wires 14 sandwiched between two prisms 52. Polarizing cube 90 can include two arrays of elongated wires 14 sandwiched between two prisms 52. Each prism 52 can include two triangular faces 11 linked by an inner face 71 and two outer faces 72.

Polarizing cubes 80 and 90 can have a maximum width $W_2$ of ≤4 mm, ≤3 mm, ≤2.5 mm, ≤2 mm, ≤1.5 mm, ≤1.3 mm, ≤1.1 mm, ≤1.0 mm, or ≤0.6 mm. The maximum width $W_2$ can be a straight-line distance, from and perpendicular to one outer face (or uncut-side) 72 to an opposite outer face (or uncut-side) 72 of the other prism.

Illustrated in FIG. 10 are four of the prisms 52 assembled together into a polarizing cube 100, similar to polarizing cube 20 described above. The ends 11 can be triangle-shaped as shown, or can be another shape such as for example isosceles trapezoid-shape or trapezoid-shape. The uncut-sides 71 can face outward. At least one of the uncut-sides 71 can be the first side $31_a$ with the array of elongated wires 14. Two of the uncut-sides 71 can be the first side $31_a$ with the array of elongated wires 14. As shown in FIG. 10, three of the uncut-sides can be first sides $31_a$ with the array of elongated wires 14. Although not shown in the figures, all four of the uncut-sides 71 can be the first side $31_a$ with the array of elongated wires 14. Each cut-side 72 can face a cut-side 72 of an adjacent prism 52. The ends 11 can form two opposite cube ends.

The method described above can result in a very small polarizing cube 100. For example, the polarizing cube 100 can have a maximum width $W_1$ of ≤7 mm, ≤4.5 mm, ≤3.4 mm, ≤2.5 mm, ≤2 mm, ≤1.5 mm, ≤1.3 mm, ≤1.1 mm, or ≤0.9 mm. The maximum width $W_1$ can be a straight-line distance, from and perpendicular to one uncut-side 71, to an opposite uncut-side 71.

Another method of manufacturing a cube polarizer can comprise some or all of the following steps. The steps can be performed in the following or other order. There may be additional steps not described below. These additional steps may be before, between, or after those described.

1. Providing an embedded wire grid polarizer 110 or 120 (e.g. plate-polarizer):
    a. As shown in FIG. 11, embedded wire grid polarizer 110 includes a first substrate 31f, a second substrate 31s, and a first array of elongated wires 14f sandwiched between the first substrate 31f and the second substrate 31s. The first array of elongated wires 14f can be attached to, and can adjoin, the first substrate 31f and the second substrate 31s. The first array of elongated wires 14f can be on, in, or partially in the first substrate 31f and/or the second substrate 31s. Starting with embedded wire grid polarizer 110 can result in polarizing cube 80, as shown in FIG. 8.
    b. As shown in FIG. 12, embedded wire grid polarizer 120 includes the first array of elongated wires 14f, plus a second array of elongated wires 14s, both sandwiched between the first substrate 3f and the second substrate 31s. The first array of elongated wires 14f can be attached to, can adjoin, and can be on, in, or partially in the first substrate 31f. The second array of elongated wires 14f can be attached to and can adjoin the first array of elongated wires 14f and to the second substrate 31s. The second array of elongated wires 14f can adjoin and be on, in, or partially in the second substrate 31s. Starting with embedded wire grid polarizer 120 can result in polarizing cube 90, as shown in FIG. 9.
2. Cutting a first cut 42 through the embedded wire grid polarizer 110 parallel to an imaginary line 44, the imaginary line 44 extending across an outer-side of the first substrate 31f and either parallel to or perpendicular to the wires (the imaginary line 44 extending into the page of FIG. 13), at a first angle $A_1$ that is oblique with respect to an imaginary plane 41, the imaginary plane 41 passing through the imaginary line 44 and perpendicular to the first array of elongated wires 14f, the first cut 42 extending through the first substrate 31f, the second substrate 31s, and the first array of elongated wires 14. See FIG. 13.
3. Cutting a second cut 43 through the embedded wire grid polarizer parallel to the imaginary line 44, at a second angle $A_2$ that is oblique with respect to the imaginary plane 41, the second cut 43 extending through the first substrate 31f, the second substrate 31s, and the first array of elongated wires 14, the second angle $A_2$ being on an opposite side of the imaginary plane 41 from the first angle $A_1$. See FIG. 13.
4. Repeating the first cut 42 and the second cut 43, but shifted over (distance d2) and spaced to form a prism with two pairs of parallel, opposite cut-sides formed by the first cut 42 and the second cut 43. Each repeated imaginary line 44 and imaginary plane 41 can be parallel to the preceding imaginary line 44 and imaginary plane 41, respectively. See FIG. 13.

In the above method, the first cut 42 can be made, then the second cut 43, then repeated first cut 42/second cut 43. These cuts 42 and 43 can also be made in another order, such as for example, multiple first cuts 42, then multiple second cuts 43.

A result of this method can be polarizing cubes similar to the polarizing cubes 80 or 90 in FIGS. 8-9, which can have characteristics of the polarizing cubes 80 or 90 as described herein. To form polarizing cubes with square-shaped ends, similar to polarizing cubes 80 or 90, the first angle $A_1$ and the second angle $A_2$ can each equal 45°, and the shifted over distance d2 can equal a thickness $Th_2$ of the embedded wire grid polarizer 120 or 130, respectively, plus the saw blade kerf. The first angle $A_1$, the second angle $A_2$, and the shifted over distance d2 can be adjusted for other parallelogram-shapes. In one embodiment, the first angle $A_1$ and the second angle $A_2$ can have the same magnitude.

In the various embodiments described herein, the arrays of elongated wires 14, 14f, and 14s can be on the outer side 13, the first side 31a, the first substrate 31f, or the second substrate 31s (e.g. see U.S. Pat. No. 6,208,463). The arrays of elongated wires 14, 14f, and 14s can be in or partially in the outer side 13, the first side 31a, the first substrate 31f, or the second substrate 31s. USA patent publication number US 2014/0300964 teaches wires in the substrate. Alternatively, wires can be patterned on a substrate, then an overcoat, applied by methods such as for example spin-on glass or atomic layer deposition, can embed the wires.

An advantage of embedding the array of elongated wires 14 is facilitating an adhesive-free bonding technique to bond the two prisms together. Use of an adhesive-free bonding technique can allow the optical device to withstand higher temperatures. If an adhesive is used instead of an adhesive-free bonding technique, then the adhesive might fail at high temperatures. Use of an adhesive-free bonding technique can allow use at high temperatures. Thus, at least for some applications, an adhesive-free bonding technique may be preferred.

Attachment methods described herein, including the inner sides 12 of the polarizing cube 20, the prisms 52 attached together to form polarizing cubes 80 and 90, the first array of elongated wires 14f attached to the second substrate 31s in embedded wire grid polarizer 110, and the first array of elongated wires 14f attached to the second array of elongated wires 14s in embedded wire grid polarizer 120, can be done with an adhesive or by an adhesive-free bonding technique.

What is claimed is:

1. A method of manufacturing a cube polarizer, the method comprising:
    providing an embedded wire grid polarizer including a first substrate, a second substrate, and a first array of elongated wires sandwiched between the first substrate and the second substrate;
    cutting a first cut through the embedded wire grid polarizer parallel to an imaginary line, the imaginary line extending across an outer-side of the first substrate and either parallel to or perpendicular to the wires, at a first angle that is oblique with respect to an imaginary plane, the imaginary plane passing through the imaginary line and perpendicular to the first array of elongated wires, the first cut extending through the first substrate, the second substrate, and the first array of elongated wires;
    cutting a second cut through the embedded wire grid polarizer parallel to the imaginary line, at a second angle that is oblique with respect to the imaginary plane, the second cut extending through the first substrate, the second substrate, and the first array of elongated wires, the second angle being on an opposite side of the imaginary plane from the first angle, and the first angle equals the second angle; and
    repeating the first cut and the second cut, but shifted over and spaced to form polarizing cubes, each cube including a pair of prisms, each cube has two pairs of opposite, parallel cut-sides formed by the first cut and by the second cut, the cut-sides facing outwards, each end of each prism has a triangle-shape or an isosceles trapezoid-shape.

2. The method of claim 1, wherein repeating the first cut and the second cut includes multiple first cuts then multiple second cuts.

3. The method of claim 1, further comprising a second array of elongated wires, attached to and sandwiched between the second substrate and the first array of elongated wires.

4. A method of manufacturing a cube polarizer, the method comprising:
    providing an embedded wire grid polarizer including a first substrate, a second substrate, and a first array of elongated wires sandwiched between the first substrate and the second substrate;
    cutting a first cut through the embedded wire grid polarizer parallel to an imaginary line, the imaginary line extending across an outer-side of the first substrate and either parallel to or perpendicular to the wires, at a first angle that is oblique with respect to an imaginary plane, the imaginary plane passing through the imaginary line and perpendicular to the first array of elongated wires, the first cut extending through the first substrate, the second substrate, and the first array of elongated wires;
    cutting a second cut through the embedded wire grid polarizer parallel to the imaginary line, at a second angle that is oblique with respect to the imaginary plane, the second cut extending through the first substrate, the second substrate, and the first array of elongated wires, the second angle being on an opposite side of the imaginary plane from the first angle; and
    repeating the first cut and the second cut, but shifted over and spaced to form polarizing cubes, each cube including a pair of prisms, each cube has two pairs of opposite cut-sides formed by the first cut and by the second cut, the cut-sides facing outwards.

5. The method of claim 4, wherein each end of each prism has a triangle-shape.

6. The method of claim 4, wherein each end of each prism has an isosceles trapezoid-shape.

7. The method of claim 4, wherein the two opposite cut-sides of each pair are parallel with respect to each other.

8. The method of claim 4, wherein repeating the first cut and the second cut includes multiple first cuts then multiple second cuts.

9. The method of claim 4, wherein repeating the first cut and the second cut includes making the first cut, then making the second cut, then repeating in this order.

10. The method of claim 4, wherein the imaginary line is parallel to the wires.

11. The method of claim 4, further comprising a second array of elongated wires, attached to and sandwiched between the second substrate and the first array of elongated wires.

12. The method of claim 4, wherein the first array of elongated wires are embedded in the first substrate and the second substrate is bonded to the first array of elongated wires by an adhesive-free bonding technique.

13. The method of claim 4, wherein a maximum width is ≤2 mm, the maximum width being a straight-line distance, from a cut-side to an opposite cut-side.

14. The method of claim 4, wherein the first angle equals 45° and the second angle equals 45°.

15. A method of manufacturing a cube polarizer, the method comprising:

providing an embedded wire grid polarizer including a first substrate, a second substrate, and a first array of elongated wires sandwiched between the first substrate and the second substrate;

cutting a first cut through the embedded wire grid polarizer parallel to an imaginary line, the imaginary line extending across an outer-side of the first substrate and either parallel to or perpendicular to the wires, at a first angle that is oblique with respect to an imaginary plane, the imaginary plane passing through the imaginary line and perpendicular to the first array of elongated wires, the first cut extending through the first substrate, the second substrate, and the first array of elongated wires;

cutting a second cut through the embedded wire grid polarizer parallel to the imaginary line, at a second angle that is oblique with respect to the imaginary plane, the second cut extending through the first substrate, the second substrate, and the first array of elongated wires, the second angle being on an opposite side of the imaginary plane from the first angle; and repeating the first cut and the second cut, but shifted over and spaced to form a prism with two pairs of parallel, opposite cut-sides formed by the first cut and the second cut.

16. The method of claim 15, further comprising a second array of elongated wires, attached to and sandwiched between the second substrate and the first array of elongated wires.

17. The method of claim 15, wherein the first array of elongated wires are embedded in the first substrate and the second substrate is bonded to the first array of elongated wires by an adhesive-free bonding technique.

18. The method of claim 15, wherein a maximum width is ≤2 mm, the maximum width being a straight-line distance, from a cut-side to an opposite cut-side.

19. The method of claim 15, wherein the first angle equals 45° and the second angle equals 45°.

20. The method of claim 15, wherein the imaginary line is parallel to the wires.

* * * * *